Sept. 25, 1962  J. STÖBI  3,055,083

POOR-DEFLECTION TYPE ROLLER

Filed July 14, 1961

INVENTOR:
JOHANN STÖbi
BY:
*Henderoth, Lind & Ponack*
ATTORNEYS

3,055,083
POOR-DEFLECTION TYPE ROLLER

Johann Stöbi, Uzwil, St. Gallen, Switzerland, assignor to Maschinenfabrik Benninger A.G., Uzwil, Switzerland
Filed July 14, 1961, Ser. No. 124,076
Claims priority, application Switzerland July 15, 1960
3 Claims. (Cl. 29—116)

The present invention relates to rollers as used for machines pertaining to the textile industry, fabrication of synthetics, printing factories, where these rollers are serving as press rollers, printing rollers or backing rollers and the like. On all these services the rollers are required to show only a very slight deflection even at heavy load.

In a known construction of a poor-deflection type roll the desired effect is obtained by transferring the load onto a hydraulic padding which in turn passes the load to a carrier support the deflection of which does not affect the function of the roller any longer. In view of its construction such an arrangement requires high accuracy of manufacture, and calls for a hydraulic system which, in many cases, is not desirable.

These and other drawbacks of known constructions are avoided in the poor-deflection type roll of the present invention by providing on at least two places a support for the cylindrical-shaped roller shell by means of whip-type elements arranged around a shaft or axle.

Other features and advantages of the invention will become apparent from the description now to follow of preferred embodiments thereof given by way of example only and in which reference will be made to the accompanying drawing showing two examples of poor-deflection type rollers in unloaded condition. In the drawing.

Figure 1:
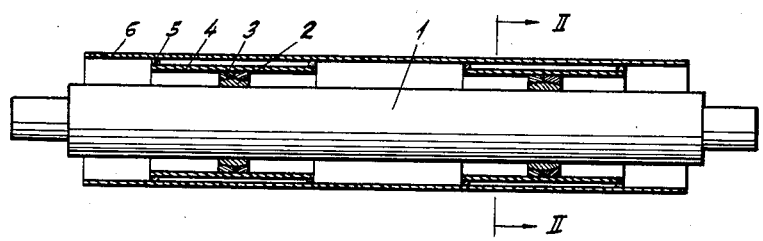
FIGURE 1 is a section along the line I—I of FIGURE 2.
Figure 2:
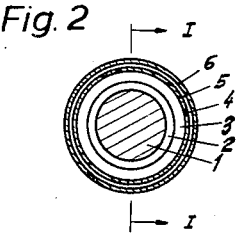
FIGURE 2 is a section along the line II—II of FIGURE 1 through a poor-deflection type roller supported at four places.

According to FIGURE 1 an axle or shaft 1 of any appropriate cross-sectional form carries spherical bearings consisting of inner bearing elements 2 and of other bearing elements 3 the latter being made of two parts for easier assembling. The inner bearing elements 2 are fixedly connected with the axle or shaft 1 and the one half of the outer bearing elements 3 are fixedly connected with tubes 4 forming a balance or whip. At both of their ends the tubes 4 are reinforced by rings 5 forming the supporting members supporting the cylindrical roller shell 6.

Figure 3:
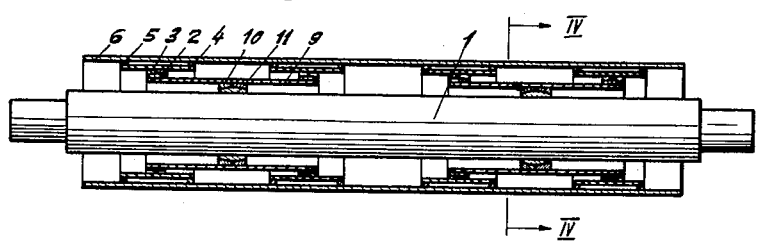
FIGURE 3 is a section along the line III—III of FIGURE 4
Figure 4:
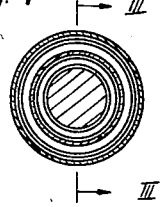
FIGURE 4 is a section along the line IV—IV of FIGURE 3 through a poor-deflection type roller supported at eight places.

Assuming now that during operation the roller shell 6 is loaded by outer force action along a tangent then this load is first transmitted to the rings 5 serving as supports. From the rings 5 the load is carried off to the axle or shaft 1 through the tube 4 and the spherical bearings 2, 3. The deflection of the tubes 4 acting as whips and of the axle or shaft, occurring under this lead has no influence onto the roller shell 6 which owing to its 4-point support is deflected to a disregardable extent only. For machines requiring particularly high stability of the rollers, or in rollers of extreme length the stability may be increased by the arrangement of further supporting places as illustrated by the embodiment of FIGURES 3 and 4.

In this embodiment the lead applied to the roller shell 6 is transmitted by the rings 5 onto the tubes 4 acting as whips. These whips in turn transmit the load over spherical bearings consisting of bearing elements 2 and 3 onto tubes 9 which act as intermediate whips. From these intermediate whips the load is passed through bearing elements 10 and 11 to the roller shaft or axle 1. The deflection of the tubes 4 and 9 and of the axle or shaft 1 under load has no influence onto the stability of the roller shell 6, said stability being extraordinarily high owing to the octuple support.

I claim:

1. A roller of the type which deflects minimally under heavy load for a printing press or the like, comprising a hollow tubular one piece shell which is at least slightly flexible, a shaft having substantially greater rigidity than said shell and positioned along the axis of said shell, a plurality of inner bearing rings having convex outer bearing surfaces spaced along the length of said shaft, a plurality of cylindrical load transfer elements, one around each inner bearing ring and being supported on said bearing rings at the middle of the longitudinal length of said load transfer elements, and supporting ring members on the outside of the ends of said load transfer elements supporting the roller at spaced points along the length thereof, whereby loading of the roller results in several small flexions thereof between the supporting ring members rather than in one large flexion.

2. A roller as claimed in claim 1 in which said bearing rings have convex outer surfaces and said load transfer elements have concave surfaces at the middle thereof cooperating with the convex outer surfaces of said bearing rings.

3. A roller as claimed in claim 1 in which said supporting ring members each comprise a further bearing ring on each end of said load transfer element, a further load transfer element around each further bearing ring and being supported on said bearing ring at the middle of the longitudinal length of said further load transfer element, and further supporting ring members on the outside of the ends of said further load transfer elements supporting the roller at spaced points along the length thereof.

References Cited in the file of this patent
UNITED STATES PATENTS

| | | |
|---|---|---|
| 2,587,627 | Kauffman | Mar. 4, 1952 |
| 2,727,280 | Waite | Dec. 20, 1955 |
| 2,771,658 | Morrill | Nov. 27, 1956 |